United States Patent
Nakamura et al.

(10) Patent No.: US 11,643,771 B2
(45) Date of Patent: May 9, 2023

(54) REINFORCING FIBER BUNDLE, REINFORCING FIBER-OPENING WOVEN FABRIC, FIBER REINFORCED COMPOSITE, AND METHODS FOR PRODUCING THEREOF

(71) Applicant: SEKISUI CHEMICAL CO., LTD., Osaka-fu (JP)

(72) Inventors: Masanori Nakamura, Kyoto-fu (JP); Yuji Fujimori, Kyoto-fu (JP); Toshio Inamori, Kyoto-fu (JP); Toshio Yamane, Kyoto-fu (JP)

(73) Assignee: SEKISUI CHEMICAL CO., LTD., Osaka-Fu (JP)

( * ) Notice: Subject to any disclaimer, the term of this patent is extended or adjusted under 35 U.S.C. 154(b) by 0 days.

(21) Appl. No.: 16/644,213

(22) PCT Filed: Sep. 28, 2018

(86) PCT No.: PCT/JP2018/036396
§ 371 (c)(1),
(2) Date: Mar. 4, 2020

(87) PCT Pub. No.: WO2019/066012
PCT Pub. Date: Apr. 4, 2019

(65) Prior Publication Data
US 2020/0190729 A1    Jun. 18, 2020

(30) Foreign Application Priority Data

Sep. 29, 2017  (JP) .............................. JP2017-190269
Nov. 6, 2017   (JP) .............................. JP2017-213391
Jan. 17, 2018  (JP) .............................. JP2018-005317

(51) Int. Cl.
D06M 11/74    (2006.01)
C08J 5/04     (2006.01)
(Continued)

(52) U.S. Cl.
CPC .............. *D06M 11/74* (2013.01); *C08J 5/042* (2013.01); *C08J 5/06* (2013.01); *D06M 2101/40* (2013.01)

(58) Field of Classification Search
CPC ................. F16D 69/023; Y10T 428/30; Y10T 442/2926; Y10T 442/2975;
(Continued)

(56) References Cited

U.S. PATENT DOCUMENTS 5,952,249 A * 9/1999 Gibson .................. F16D 69/023
                                                       442/179
2006/0193751 A1  8/2006 Jung
(Continued)

FOREIGN PATENT DOCUMENTS

CN    104828823    8/2015
JP    4-826        1/1992
(Continued)

OTHER PUBLICATIONS

International Search Report (ISR) dated Dec. 25, 2018 in International (PCT) Application No. PCT/JP2018/036396.
(Continued)

*Primary Examiner* — Camie S Thompson
(74) *Attorney, Agent, or Firm* — Wenderoth, Lind & Ponack, L.L.P.

(57) ABSTRACT

[Problem] To provide a reinforcing fiber bundle that can maintain a good opening state of reinforcing fibers and that can produce a fiber-reinforced composite having excellent mechanical strength; a reinforcing fiber woven fabric using the same; a carbon fiber reinforcing composite using the same; and methods for producing the same.
[Solution] A reinforcing fiber bundle comprising a plurality of reinforcing fibers is produced, the reinforcing fiber bundle
(Continued)

having a cross-linking portion comprising a carbon allotrope between the reinforcing fibers.

20 Claims, 5 Drawing Sheets

(51) Int. Cl.
*C08J 5/06* (2006.01)
*D06M 101/40* (2006.01)

(58) Field of Classification Search
CPC .............. Y10T 442/2984; C04B 35/83; D06M 2101/40; D06M 11/74; C08J 5/06; C08J 5/042; C01B 31/00; B05D 5/00
USPC ........ 427/228, 419.2, 419.7, 208.8; 428/698, 428/409, 319.1, 408; 442/172, 178, 179, 442/148
See application file for complete search history.

(56) References Cited

U.S. PATENT DOCUMENTS

| | | | |
|---|---|---|---|
| 2007/0172408 A1* | 7/2007 | Takagi | C04B 14/022 423/445 R |
| 2014/0194018 A1 | 7/2014 | Nakamura | |
| 2017/0037200 A1 | 2/2017 | Humfeld | |

FOREIGN PATENT DOCUMENTS

| | | | |
|---|---|---|---|
| JP | 2007-277086 | | 10/2007 |
| JP | 2013-177705 | | 9/2013 |
| JP | 2014-122439 | | 7/2014 |
| JP | 2014-162116 | * | 9/2014 |
| JP | 2015-40232 | | 3/2015 |
| JP | 2015-93883 | | 5/2015 |
| JP | 2016-222482 | | 12/2016 |
| WO | 2013/027674 | | 2/2013 |
| WO | 2013/084669 | | 6/2013 |

OTHER PUBLICATIONS

Japanese Office Action dated Jul. 19, 2019 in corresponding Japanese Patent Application No. 2019-512938, together with English translation.
Abdelghani Laachachi et al., "A chemical method to graft carbon nanotubes onto a carbon fiber", Materials Letters, 62, pp. 394-397, 2008
International Preliminary Report on Patentability dated Apr. 9, 2020 in International (PCT) Application No. PCT/JP2018/036396.
Extended European Search Report dated May 31, 2021, in corresponding European Patent Application No. 18861302.0.
Office Action dated Apr. 15, 2022 in corresponding Japanese Patent Application No. 2019-183617, with Machine English translation.

* cited by examiner

REINFORCING FIBER BUNDLE, REINFORCING FIBER-OPENING WOVEN FABRIC, FIBER REINFORCED COMPOSITE, AND METHODS FOR PRODUCING THEREOF

CROSS-REFERENCE TO RELATED APPLICATIONS

The present application claims priority based on Japanese Patent Application No. 2017-190269 filed on Sep. 29, 2017, Japanese Patent Application No. 2017-213391 filed on Nov. 6, 2017, and Japanese Patent Application No. 2018-005317 filed on Jan. 17, 2018, the entire disclosures of which are incorporated by reference to form a part of the disclosure of the present specification.

BACKGROUND OF THE INVENTION

Field of the Invention

The present invention relates to a reinforcing fiber bundle, a reinforcing fiber-opening woven fabric, a fiber reinforced composite, and methods for producing thereof.

Background Art

Since a fiber reinforced composite material in which a matrix resin is reinforced with reinforcing fibers is of light weight while having excellent strength, rigidity, and dimensional stability, etc., it is widely used in various fields such as office equipment, automobiles, computers (e.g., housings of IC trays and laptops), water stops, and windmill blades, and its demand is increasing year by year.

In recent years, reinforcing fiber woven fabrics have been drawing attention for their designs, made by a special weaving method upon utilizing the optical reflection characteristics of carbon fibers. For example, business bags are sold that use fabrics of Kyoto Nishijin Weaving made of carbon fiber as is, and also front panels for automobiles that make use of the appearance of the reinforcing fiber woven fabrics.

However, the reinforcing fiber used for the fiber-reinforced composite material has a different chemical composition and molecular structure from the matrix resin, and has low compatibility with the matrix resin. Therefore, the adhesiveness between the reinforcing fiber and the matrix resin is low, which gives rise to the object of improving the adhesiveness between the reinforcing fiber and the matrix resin.

A fiber reinforced composite material using a thermoplastic resin as the matrix resin is obtained by molding compound pellets via various methods such as injection molding, injection compression molding, extrusion molding, and press molding. In these molding methods, the reinforcing fibers are often used in the form of a fiber bundle. When used in the form of such fiber bundle, opening state of the fiber bundle also greatly affects the mechanical strength properties of the fiber-reinforced composite material in addition to interfacial problems such as the compatibility and the adhesiveness between the reinforcing fiber and the matrix resin.

In particular, a general method used when manufacturing the fiber-reinforced composite material using a thermoplastic resin as the matrix resin, is a method by pressurizing and heating a sheet made of a thermoplastic resin and the reinforcing fiber bundle. It is known that at this time, when the reinforcing fibers constituting the reinforcing fiber bundle are not sufficiently opened, the resin will not be sufficiently impregnated between the reinforcing fibers, resulting in reduction of the mechanical strength of the fiber-reinforced composite material.

Therefore, in order to improve the compatibility between the reinforcing fibers and the matrix resin and to improve the impregnation of the thermoplastic resin by widening the interval between the reinforcing fibers, there is considered a method by diffusing various particles on the reinforcing fiber surface or a method for opening fibers to grow particles on the reinforcing fiber surface.

Patent Document 1 (Japanese Patent Application Laid-Open Publication No. 2013-177705) discloses a carbon fiber bundle obtainable by immersing a carbon fiber bundle in an emulsion which is obtained by dispersing water-dispersible polymer particles in a solution containing water and alcohol and then drying.

Patent Document 2 (Japanese Patent Application Laid-Open Publication No. 2014-122439) discloses a method for producing a carbon fiber bundle in which fine particles and small particles are attached to the surface of the carbon fiber bundle.

Patent Document 3 (WO2013/027674) and Patent Document 4 (Japanese Patent Application Laid-Open Publication No. 2014-162116) disclose that a carbon fiber is impregnated in a monomer solution of a naphthoxazine resin and then heated so that a spacer is formed on the surface of the carbon fiber.

SUMMARY OF THE INVENTION

Problem to be Solved by the Invention

However, the carbon fibers disclosed in Patent Documents 1 and 2 to which synthetic resin particles are added or adhered to the surface are have the problem that the thermoplastic resin cannot be sufficiently impregnated between the reinforcing fibers when pressurizing the thermoplastic resin sheet and the reinforcing fiber bundle while heating because the synthetic resin particles are crushed or melted and thus fail to retain the opened state of the reinforcing fibers.

On the other hand, as for the carbon fiber composite material described in Patent Documents 3 and 4, there is formed concavity and convexity on the surface of the carbon fibers. When the carbon fibers are bundled together, the concavity and convexity formed on the surface of the carbon fibers engage with one another so that a gap between the fibers in the portion where the carbon fibers are engaged becomes smaller. As a result, there is a problem that impregnation of the thermoplastic resin between the carbon fibers becomes inadequate.

In addition, the present inventors have found that resins such as acrylic resins and polycarbonate resins having good mechanical properties and transparency are relatively high in melt viscosity, which makes it uneasy with the conventional impregnation method to impregnate the reinforcing fiber woven fabric with the resin uniformly.

The present invention has been made in order to solve the above-mentioned problems, and the purpose thereof is to provide a reinforcing fiber bundle that can maintain the reinforcing fibers in good fiber-opening state and that can produce a fiber-reinforced composite having excellent mechanical strength; a reinforcing fiber woven fabric using the same; a carbon fiber reinforced composite using the same; and a method for producing thereof. Another object of the present invention is to provide a reinforcing fiber-opening woven fabric excellent in appearance such as transparency and design, a carbon fiber reinforced composite using the same, and a method for producing thereof.

Means for Solving Problem

As a result of intensive studies on a method for solving the above problems, the present inventors have found that a reinforcing fiber woven fabric composed of warp and weft bundles made of carbon fibers having a cross-linking portion including a different carbon allotrope from the carbon fibers between the carbon fibers can, for example, maintain the open state between the carbon fibers at regular intervals even during heating and pressurization, and as a result, even a thermoplastic resin having high melt viscosity and relatively low impregnation can be uniformly impregnated, and a reinforcing fiber-opening woven fabric is obtainable, in which the voids can be reduced that are unimpregnated portions in the reinforcing fiber woven fabric. Further, it was found that a fiber-reinforced composite having excellent mechanical strength and the like can be obtained by impregnating such reinforcing fiber-opening woven fabric with a matrix resin. The present invention is based on such findings.

That is, the overview of the present invention is as follows:

[1] A reinforcing fiber bundle comprising a plurality of reinforcing fibers, the reinforcing fiber bundle having a cross-linking portion comprising a carbon allotrope between the reinforcing fibers.

[2] The reinforcing fiber bundle according to [1], wherein the carbon allotrope comprises an amorphous carbon.

[3] The reinforcing fiber bundle according to [1] or [2], wherein the cross-linking portion is formed by bonding a plurality of carbon allotrope particles.

[4] The reinforcing fiber bundle according to any one of [1] to [3], wherein the cross-linking portion comprises at least one particle selected from the group consisting of a thermosetting resin, a metal, silica, and a thermoplastic resin.

[5] The reinforcing fiber bundle according to any one of [1] to [4], wherein the reinforcing fiber is oriented in one direction or in the form of a woven fabric.

[6] The reinforcing fiber bundle according to any one of [1] to [5], wherein the reinforcing fibers comprise carbon fibers.

[7] A method for producing a reinforcing fiber bundle, comprising:
an impregnation step of bringing a fiber pretreatment liquid comprising any one or more of particles selected from the group consisting of a thermosetting resin, a metal, silica, and a thermoplastic resin into contact with a plurality of reinforcing fibers to produce an impregnated fiber bundle; and
a carbonization step of heating the impregnated fiber bundle to convert the thermosetting resin into a carbon allotrope.

[8] The method according to [7], wherein the fiber pretreatment liquid further comprises a monomer which generates a thermosetting resin by polymerization reaction.

[9] A reinforcing fiber-opening woven fabric formed of a warp bundle and a weft bundle, the bundle comprising carbon fibers and a cross-linking portion comprising a carbon allotrope different from the carbon fibers between the carbon fibers.

[10] The reinforcing fiber-opening woven fabric according to [9], wherein the cross-linking portion comprises at least one particle selected from the group consisting of a thermosetting resin, a metal, silica, and a thermoplastic resin.

[11] The reinforcing fiber-opening woven fabric according to [9] or [10], wherein the carbon allotrope comprises an amorphous carbon.

[12] The reinforcing fiber-opening woven fabric according to any one of [9] to [11], wherein the carbon allotrope is an amorphous carbon.

[13] A method for producing a reinforcing fiber-opening woven fabric comprising:
a preparation step of a reinforcing fiber woven fabric formed of a warp bundle and a weft bundle comprising carbon fibers;
an impregnation step of bringing the reinforcing fiber woven fabric in contact with a fiber opening solution comprising a monomer which generates a thermosetting resin by polymerization reaction; and
a carbonization step of heating the reinforcing fiber woven fabric containing the monomer from said impregnation step to form a cross-linking portion comprising a carbon allotrope different from the carbon fibers between the carbon fibers.

[14] The method according to [13], wherein the fiber opening solution further comprises any one or more particles selected from the group consisting of a thermosetting resin, a metal, silica, and a thermoplastic resin.

[15] The method according to [13] or [14], further comprising a drying step after the carbonization step.

[16] The method according to any one of [12] to [15], wherein the thickness of the reinforcing fiber-opening woven fabric produced through the each step is increased by 2% or more as compared with the thickness of the reinforcing fiber woven fabric.

[17] A fiber-reinforced composite comprising the reinforcing fiber bundle according to any one of [1] to [6] or the reinforcing fiber-opening woven fabric according to any one of [9] to [12] and a matrix resin.

[18] The fiber-reinforced composite according to [17], wherein the matrix resin is a thermoplastic resin.

[19] A method for producing a fiber-reinforced composite comprising a heat impregnation step of impregnating the reinforcing fiber bundle according to any one of [1] to [6] or the reinforcing fiber-opening woven fabric according to any one of [9] to [12] with a matrix resin.

Advantageous Effect of the Invention

The reinforcing fiber bundle and the reinforcing fiber-opening woven fabric of the present invention have fibers which are opened by a cross-linking portion comprising a carbon allotrope. Therefore, the opened state between the fibers can be maintained at regular intervals even during heating and pressurization, and as a result, even a thermoplastic resin having a high melt viscosity and a relatively low impregnation property can be evenly impregnated so that voids that are unimpregnated portions in the reinforcing fiber bundle and the reinforcing fiber woven fabric are reduced.

In particular, the reinforcing fiber bundle and the reinforcing fiber-opening woven fabric of the present invention have a cross-linking portion comprising a carbon allotrope having excellent rigidity, so that the straightness of the fiber bundle is maintained during molding, as well as that the straightness of the fiber bundle is improved, and as a result resin impregnation into the fiber bundle is improved.

Therefore, a thermoplastic resin such as a synthetic resin can be sufficiently impregnated between the fibers of the reinforcing fiber bundle and the reinforcing fiber-opening woven fabric, and a fiber-reinforced composite having excellent mechanical strength can be produced.

In addition, the reinforcing fiber bundle, the reinforcing fiber-opening woven fabric and the fiber reinforced composite of the present invention have increased thickness because the opened state is formed, maintained, and stabilized as compared to before the opening which makes it possible to provide an excellent appearance by ensuring transparency and glossiness, etc.

Furthermore, according to the method for producing a reinforcing fiber bundle or a reinforcing fiber-opening woven fabric of the present invention, the fiber pretreatment liquid is brought in contact with the fiber to introduce the thermosetting resin particles between the fibers, and subsequently the thermosetting resin particles are carbonized to form a cross-linking portion composed of a carbon allotrope; therefore, the cross-linking portion can be sufficiently introduced between the fibers and a reinforcing fiber bundle or a reinforcing fiber-opening woven fabric can be produced with a good opened state.

MODE FOR CARRYING OUT THE INVENTION

Figure 1:
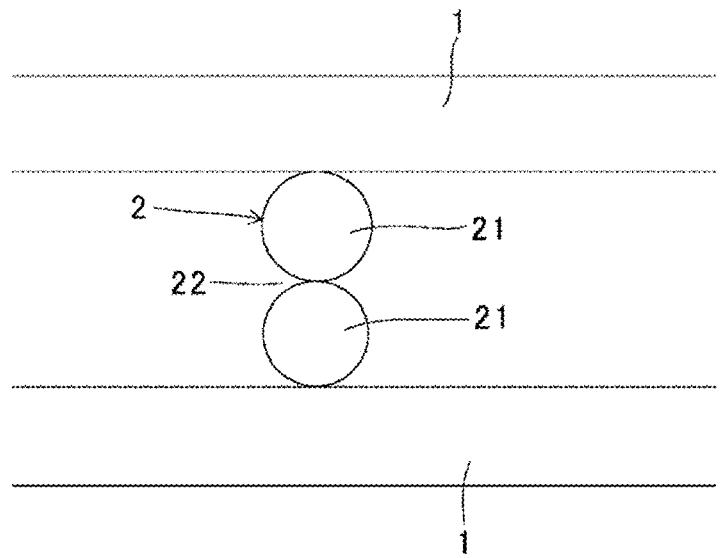
FIG. 1 is a schematic diagram showing the reinforcing fiber bundle.

Hereinafter, an example of a preferable embodiment for carrying out the present invention will be described. However, the following embodiments are examples for explaining the present invention, and the present invention is not limited to the following embodiments.

An example of the reinforcing fiber bundle of the present invention will be described with reference to the drawings. The reinforcing fiber bundle comprises a a plurality of reinforcing fibers and a cross-linking portion that cross-links the reinforcing fibers, the cross-linking portion comprising a carbon allotrope Examples of the reinforcing fiber are not particularly limited, including, glass fibers, carbon fibers, polyester fibers such as PEN or PET, aramid fibers, etc., and among these, glass fibers or carbon fibers are preferable and carbon fibers are most preferable in view of various mechanical properties and weight.

Examples of the carbon fiber include PAN-based carbon fibers and PITCH-based carbon fibers, and PAN-based carbon fibers are preferable in view of bending strength. An example of the glass fiber includes E glass fiber, and the like.

The average diameter of the reinforcing fibers is usually 4 μm or more, preferably 6 μm or more, more preferably 10 μm or more, and further preferably 20 μm or more. The average diameter of the reinforcing fibers is usually 40 μm or less, preferably 30 μm or less, and more preferably 27 μm or less. In the present invention, the fiber diameter means a diameter of a true circle having the smallest diameter that can surround the cross section in a cross section along the direction orthogonal to the length direction of the fiber.

The reinforcing fiber bundle is a bundle of a plurality of reinforcing fibers (single fibers). The number of reinforcing fibers constituting the fiber bundle is preferably 1000 to 50000. When the reinforcing fibers are carbon fibers, the number of carbon fibers constituting the fiber bundle is preferably 1000 to 50000, more preferably 12000 to 48000, and further preferably 24000 to 48000. When the reinforcing fibers are glass fibers, the number of glass fibers constituting the fiber bundle is preferably 1000 to 20000.

Examples of the form of the reinforcing fiber include, without particular limitation, fibers, woven fabrics, knitted fabrics, and nonwoven fabrics oriented in one direction, and preferred are fibers and woven fabrics oriented in one direction. Examples of the woven fabric form include plain weave, twill weave, and satin weave, and among these, plain weave or twill weave having isotropism is preferable. The form of the knitted fabric is preferably a non-crimp fabric in which the fibers are arranged in a straight advancing direction in each fiber orientation direction.

When the reinforcing fiber is in a sheet form, the basis weight of the reinforcing fiber is preferably 100 to 400 $g/m^2$ and more preferably 180 to 400 $g/m^2$. When the basis weight of the reinforcing fiber is 100 $g/m^2$ or more, the mechanical strength of the carbon fiber reinforced composite obtained using the reinforcing fiber bundle is improved. When the basis weight of the reinforcing fiber is 400 $g/m^2$ or less, the synthetic resin can be uniformly impregnated between the reinforcing fibers, and the mechanical strength of the carbon fiber reinforced composite obtained using the reinforcing fiber bundle is improved.

A cross-linking portion 2 is cross-linking between the reinforcing fibers 1 and 1. The cross-linking portion 2 is disposed so as to bridge among the reinforcing fibers. That is, the two reinforcing fibers are connected and integrated through the cross-linking portion 2. In other words, the cross-linking portion 2 is connected and integrated with the two reinforcing fibers, so that the two reinforcing fibers are connected and integrated with the cross-linking portion 2.

The cross-linking portion 2 comprises a carbon allotrope. Examples of the carbon allotrope includes, without particular limitation, non-crystalline carbons such as an amorphous carbon, graphite, diamond and the like, with preference given to non-crystalline carbons, and among these, an amorphous carbon is more preferable in view of adhesion to the carbon fiber.

Moreover, the cross-linking portion 2 may be of only the carbon allotrope, or it may contain a thermosetting resin, a metal, silica, and a thermoplastic resin, other than the carbon allotrope. For example, the use of coated particles obtained by coating particles selected from the group consisting of a thermosetting resin, a metal, silica, a thermoplastic resin, and the like with a carbon allotrope in the cross-linking portion can lead to improvement in the spread width and improvement in mechanical properties.

In the present invention, particles made of only the carbon allotrope or particles obtained by coating the carbon allotrope with a thermosetting resin, a metal, silica, a thermoplastic resin and the like may be collectively referred to as a "carbon allotrope particle".

Particles that may be used in addition to the carbon allotropes include thermosetting resins such as an epoxy resin, a phenolic resin, a melamine resin, an urea resin, an unsaturated polyester resin, and an oxazine resins; metals such as alumina, titanium, iron, and aluminum; silica; cross-linked divinylbenzene, polyolefin, PBT, PET, an acrylic resin, and a polycarbonate resin, and in view of compatibility with the carbon allotrope, preferred are an oxazine resin, a phenolic resin, silica, alumina, aluminum, cross-linked divinylbenzene, and most preferred are an oxazine resin or silica.

Preferably, the cross-linking portion 2 comprises carbon allotrope particles. As shown in FIG. 1, the carbon allotrope particles 21 are linearly connected (in beads-connected manner) to form a cross-linking portion 2, and the carbon allotrope particles at both ends are connected and integrated with the reinforcing fiber, and the two reinforcing fibers are connected and integrated via the cross-linking portion 2. In the case where a plurality of carbon allotrope particles is linearly connected as described above, the cross-linking portion may be a combination of different types of carbon allotrope particles (for example, coated particles and carbon particles).

Figure 2:
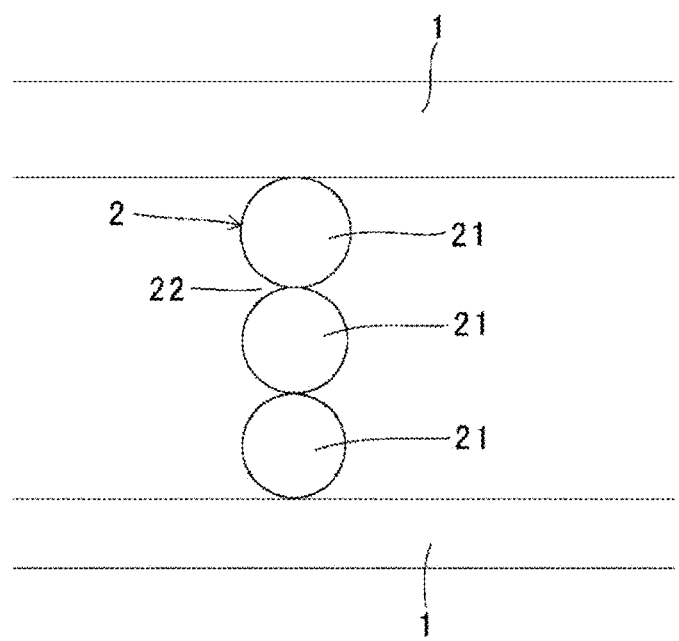
FIG. 2 is a schematic diagram showing another example of the reinforcing fiber bundle.

Although FIG. 1 shows the case where two carbon allotrope particles are connected and integrated to form the cross-linking portion 2, three or more carbon allotrope particles 21 may be connected and integrated to form the cross-linking portion 2 as shown in FIG. 2.

The cross-linking portion 2 is configured by connecting and integrating the carbon allotrope particles 21 to each other, and a concave part 22 is formed at a connection portion between the carbon allotrope particles 21. Unlike the case where the cross-linking portion 2 is formed from, for example, a single rod-like body, the cross-linking portion 2 has a concave part 22 formed; therefore the opening of the reinforcing fiber can be surely maintained upon connecting and integrating the reinforcing fibers to each other while suppressing the volume of the cross-linking portion 2.

Furthermore, the concave part 22 is formed over the entire circumference in the circumferential direction (direction perpendicular to the connecting direction of the carbon allotrope particles) in the cross-linking portion 2. Therefore, the synthetic resin impregnated between the reinforcing fibers 1 and 1 can be inserted into the concave part 22 of the cross-linking portion 2 and be in a locked state, and as a result, the integration of the reinforcing fiber 1 and the synthetic resin is strengthened so that the mechanical strength of the obtained carbon fiber reinforced composite can be improved.

The average particle diameter of the carbon allotrope particles 21 constituting the cross-linking portion 2 is usually 1 to 30 µm, preferably 1 to 20 µm, more preferably 1 to 10 µm, further preferably 2 to 8 µm, and particularly preferably 3 to 5 µm. When the average particle diameter of the carbon allotrope particles is 1 µm or more, the reinforcing fiber bundle is kept open regardless of heat and pressure applied to the reinforcing fiber bundle during the impregnation of the synthetic resin between the reinforcing fibers, and as a result, the synthetic resin can be impregnated sufficiently and uniformly in between the reinforcing fibers, and a carbon fiber reinforced composite having excellent mechanical strength can be obtained. When the average particle diameter of the carbon allotrope particles is 30 µm or less, the voids between the reinforcing fibers are sufficiently ensured so that the synthetic resin is sufficiently impregnated between the reinforcing fibers, and a carbon fiber reinforced composite having excellent mechanical strength can be obtained. Note that, in the present invention, the average particle diameter of the carbon allotrope particles is a value measured in the following manner. Firstly, by using an electron microscope, an enlarged photograph in 400 times of the reinforcing fiber bundle is taken. In the obtained micrograph, the particle diameter of the carbon allotrope particles is measured by image processing, and the arithmetic average value of the particle diameters of each carbon allotrope particle is defined as the average particle diameter of the carbon allotrope particles. Note that, the particle diameter of the carbon allotrope particles is the diameter of the smallest true circle that can surround the carbon allotrope particle.

The average number of carbon allotrope particles 21 constituting the cross-linking portion 2 is preferably 1 to 100, more preferably 2 to 20, and particularly preferably 3 to 10. The number of carbon allotrope particles 21 constituting the cross-linking portion means the number of carbon allotrope particles in the connecting direction of the two reinforcing fibers (the length direction of the cross-linking portion), and also means the arithmetic mean value of the number of carbon allotrope particles constituting each cross-linking portion 2. That is, the carbon allotrope particles connected and integrated with one reinforcing fiber bundle are defined as the first particles. The carbon allotrope particles connected and integrated with the first particles toward the other reinforcing fiber are referred to as second particles. The carbon allotrope particles connected and integrated with the second particles toward the other reinforcing fiber are referred to as the third particles. This is repeated and when the carbon allotrope particles connected and integrated with the other reinforcing fiber bundle is assumed as the nth particles, the number of carbon allotrope particles constituting the cross-linking portion is assumed as n. Note that, when a plurality of carbon allotrope particles serving as the nth particles is connected and integrated with the (n−1)th particles, the plurality of carbon allotrope particles connected and integrated with the (n−1)th particles are collectively regarded as one carbon allotrope particle.

Figure 3:
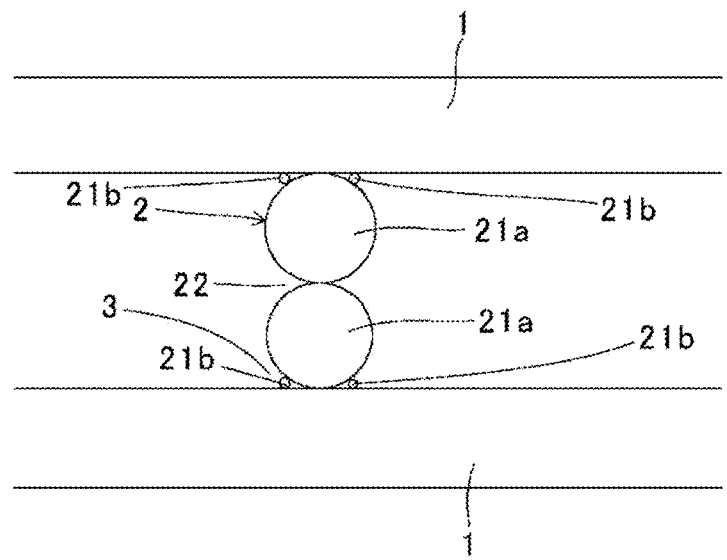
FIG. 3 is a schematic diagram showing another example of the reinforcing fiber bundle.

Furthermore, when the carbon allotrope particle 21 as above is the first carbon allotrope particle 21a, a gap 3 formed between the first carbon allotrope particles 21a and the portion of reinforcing fiber 1 opposed thereto may be provided with a plurality of second carbon allotrope particles 21b having a smaller diameter than the first allotrope particles 21a, and these second carbon allotrope particles 21b may be directly attached to and integrated with both the first carbon allotrope particles 21a and the reinforcing fibers 1 (see FIG. 3).

Carbon allotrope particles having a diameter of 40% or less of the average particle diameter of all the carbon allotrope particles are defined as second carbon allotrope particles.

The first carbon allotrope particles 21a and the plurality of second carbon allotrope particles 21b are firmly connected and integrated with the reinforcing fibers 1, and the cross-linking portion 2 is connected and integrated more firmly with the reinforcing fibers 1. Therefore, despite the heat and pressure applied to the reinforcing fiber bundle during the impregnation of the synthetic resin between the reinforcing fibers, the cross-linking portion 2 maintains the opening of the reinforcing fiber bundle, thus the synthetic resin can be impregnated between the reinforcing fibers sufficiently and uniformly, and a carbon fiber reinforced composite having excellent mechanical strength can be obtained.

The average particle diameter of the second carbon allotrope particles $21b$ is preferably 0.1 to 0.9 times the average particle diameter of the first carbon allotrope particles $21a$, more preferably 0.15 to 0.7 times, and particularly preferably 0.2 to 0.5 times. When the average particle diameter of the second carbon allotrope particles $21b$ is 0.1 times or more the average particle diameter of the first carbon allotrope particles $21a$, the connection strength between the cross-linking portion and the reinforcing fibers can be improved while improving the mechanical strength of the second carbon allotrope particles. When the average particle diameter of the second carbon allotrope particles $21b$ is 0.9 times or less than the average particle diameter of the first carbon allotrope particles $21a$, the connection area between the second carbon allotrope particles and the reinforcing fibers is increased, and as a result, the connection strength between the cross-linking portion and the reinforcing fiber can be improved.

Figure 4:
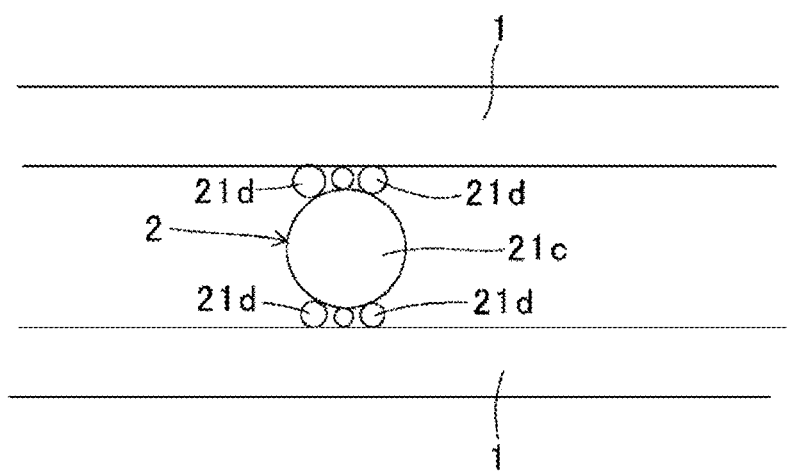
FIG. 4 is a schematic diagram showing another example of the reinforcing fiber bundle.

In FIG. 1, among the carbon allotrope particles $21a$ constituting the cross-linking portion 2, the case was explained where one carbon allotrope particle $21a$, $21a$ located at both ends is directly connected and integrated with the reinforcing fibers 1, 1; however as shown in FIG. 4, the number of carbon allotrope particle 21 that is directly connected and integrated with the reinforcing fiber 1 may be plural.

Specifically, as shown in FIG. 4, the cross-linking portion 2 may include the third carbon allotrope particle $21c$ disposed between the reinforcing fibers 1,1 and the fourth carbon allotrope particle $21d$ having a smaller diameter than the third carbon allotrope particle $21c$.

Carbon allotrope particles having a diameter of 40% or less the average particle diameter of all the carbon allotrope particles are defined as the fourth carbon allotrope particles.

A plurality of fourth carbon allotrope particles $21d$ is attached to and integrated with the surfaces of the third carbon allotrope particles $21c$, and the plurality of fourth carbon allotrope particles $21d$ are directly connected and integrated with the reinforcing fiber 1.

That is, a plurality of fourth carbon allotrope particles $21d$ is interposed between the third carbon allotrope particles $21c$ and the reinforcing fiber 1 opposed to the third carbon allotrope particles $21c$, and are connected and integrated with the third carbon allotrope particles $21c$ and the reinforcing fiber 1.

Since a plurality of fourth carbon allotrope particles $21d$ is connected and integrated with the reinforcing fiber 1, the contact area (connecting area) to the reinforcing fiber 1 is large, and the cross-linking portion 2 is firmly connected and integrated with the reinforcing fiber 1. Therefore, despite the heat and pressure applied to the reinforcing fiber bundle when the synthetic resin is impregnated between the reinforcing fibers 1,1, the cross-linking portion 2 maintains the opening of the reinforcing fiber bundle, thus the synthetic resin is impregnated between the reinforcing fibers sufficiently and uniformly, and a fiber-reinforced composite having excellent mechanical strength can be obtained.

The average particle diameter of the fourth carbon allotrope particles $21d$ is preferably 0.1 to 0.9 times the average particle diameter of the third carbon allotrope particles $21c$, more preferably 0.2 to 0.7 times, and particularly preferably 0.3 to 0.5 times. When the average particle diameter of the fourth carbon allotrope particles $21d$ is 0.1 times or more the average particle diameter of the third carbon allotrope particles $21c$, the connection strength between the cross-linking portion and the reinforcing fibers can be improved while improving the mechanical strength of the fourth carbon allotrope particles. When the average particle diameter of the fourth carbon allotrope particles $21d$ is 0.9 times or less than the average particle diameter of the third carbon allotrope particles $21c$, the connection area between the fourth carbon allotrope particles and the reinforcing fibers is increased, and as a result, the connection strength between the cross-linking portion and the reinforcing fiber can be improved.

Figure 5:
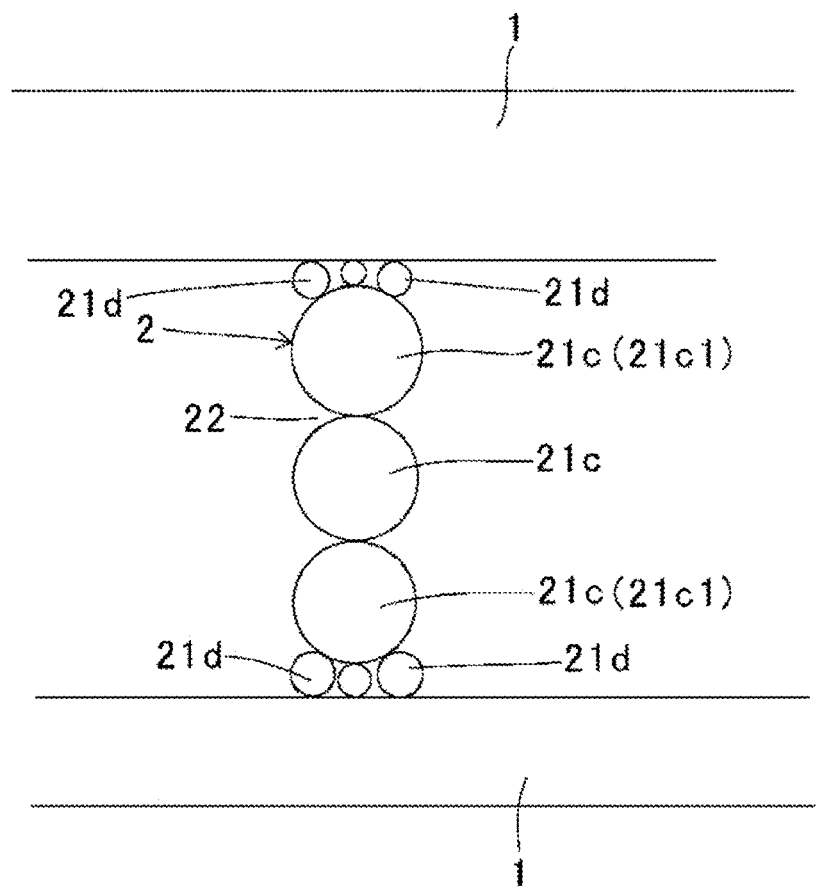
FIG. 5 is a schematic diagram showing another example of the reinforcing fiber bundle.

In FIG. 4, the case was described where the number of third carbon allotrope particle $21c$ is one; however, as shown in FIG. 5, a plurality of third carbon allotrope particles $21c$ may be connected in a linear form (in beads-connected manner) as shown in FIGS. 1 and 2. In this case, a plurality of fourth carbon allotrope particles $21d$ is attached to and integrated with the surfaces of the carbon allotrope particles $21c1$ and $21c1$ at both ends of the third carbon allotrope particles $21c$ connected in a linear form, thereby forming the cross-linking portion 2.

In the above-described reinforcing fiber bundle (for example, the reinforcing fiber bundle shown in FIGS. 1 to 5), the content of the cross-linking portion 2 is preferably 1 to 5 parts by mass with respect to 100 parts by mass of the reinforcing fibers. When the content of the cross-linking portion is 1 part by mass or more, the reinforcing fiber bundle is sufficiently opened, thus the the synthetic resin between the reinforcing fibers is impregnated sufficiently and uniformly, and a pure fiber reinforced composite having excellent mechanical strength can be obtained. When the content of the cross-linking portion is 5 parts by mass or less, the mechanical strength per unit cross-sectional area of the reinforcing fiber bundle is improved.

Next, the manufacturing method of a reinforcing fiber bundle is described. Firstly, a fiber pretreatment liquid comprising thermosetting resin particles is brought into contact with a plurality of reinforcing fibers (impregnation step) to give an impregnated fiber bundle. The thermosetting resin particles used in the production method of the present invention may be combined with at least one or more of a metal, silica and a thermoplastic resin, and also includes coated particles which is obtained by attaching a thermosetting resin in a film form onto at least a part of the surface of the metal, silica and the thermoplastic resin particles. The preferred embodiment of the metal, silica, and thermoplastic resin is as mentioned above.

Examples of the method for bringing the fiber pretreatment liquid into contact with the plurality of reinforcing fibers include, for example, a method of applying the fiber pretreatment liquid to a plurality of reinforcing fibers using a spray or a brush, and a method of dipping the reinforcing fibers in the fiber pretreatment liquid.

The fiber pretreatment liquid includes thermosetting resin particles. The thermosetting resin particles serve as a raw material for the carbon allotrope particles constituting the cross-linking portion 2.

An example of the thermosetting resin constituting the thermosetting resin particle includes an oxazine resin, and the like. Examples of the oxazine resin include a benzoxazine resin and a naphthoxazine resin, and a naphthoxazine resin is preferable.

The "oxazine resin" refers to a resin that has a 6-membered ring added to a benzene ring or a naphthalene ring and that contains oxygen and nitrogen. The benzoxazine resin has a structure represented by the following chemical formula (1). The naphthoxazine resin has a structure represented by the following chemical formula (2).

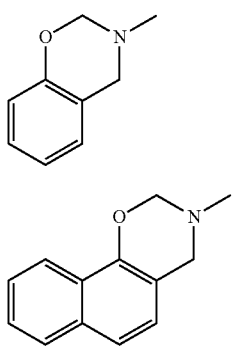

The fiber pretreatment liquid may contain a monomer that serves as a raw material for the thermosetting resin particles, and preferably contains a monomer that serves as a raw material for the oxazine resin. When the monomer used as the raw material of the thermosetting resin particle is contained in the fiber pretreatment liquid, the particles of thermosetting resin, metal, silica, or thermoplastic resin included in the fiber pretreatment liquid serve as the core so that the thermosetting resin particles are easily grown between the reinforcing fibers and are sufficiently and unfailingly arranged between the reinforcing fibers when heating the impregnated fiber bundle obtained by impregnating the fiber pretreatment liquid into the reinforcing fibers. In addition, a part of the monomer in the fiber pretreatment liquid may be polymerized without using the thermosetting resin particles as a core to generate new thermosetting resin particles.

The reinforcing fibers are bridged among with each other via the grown thermosetting resin particles and/or the thermosetting resin particles connected and integrated with each other. That is, the two reinforcing fibers are connected and integrated with each other via the grown thermosetting resin particles and/or the thermosetting resin particles connected and integrated to one another.

The monomer used as the raw material of the thermosetting resin particles will be described by illustrating the case where the thermosetting resin constituting the thermosetting resin particles is a naphthoxazine resin.

Monomers that serve as raw materials for the naphthoxazine resin are dihydroxynaphthalene which is phenols, formaldehyde, and amines.

Dihydroxynaphthalene has many isomers. Examples of the isomers of dihydroxynaphthalene include 1,3-dihydroxynaphthalene, 1,5-dihydroxynaphthalene, 1,6-dihydroxynaphthalene, 1,7-dihydroxynaphthalene, 2,3-dihydroxynaphthalene, 2,6-dihydroxynaphthalene, and 2,7-dihydroxynaphthalene. Amongst these, 1,5-dihydroxynaphthalene and 2,6-dihydroxynaphthalene are preferable, and 1,5-dihydroxynaphthalene is more preferable because of high reactivity.

Formaldehyde is preferably used as formalin. Formalin may be added with a small amount of methanol as a stabilizer in addition to formaldehyde and water. Paraformaldehyde may be used in place of formaldehyde.

Formaldehyde is preferably 1.6 to 2.4 moles per mole of dihydroxynaphthalene.

As the amines, aliphatic amines represented by general formula R—$NH_2$ are preferably used. In general formula R—$NH_2$, R is preferably an alkyl group having 5 or less carbons. Examples of the alkyl group having 5 or less carbons include a methyl group, an ethyl group, an n-propyl group, an isopropyl group, a cyclopropyl group, an n-butyl group, an isobutyl group, an s-butyl group, a t-butyl group, a cyclobutyl group, a cyclopropylmethyl group, an n-pentyl group, a cyclopentyl group, a cyclopropylethyl group, a cyclopropylmethyl group, and the like. Preferred as the alkyl groups having 5 or less carbons are a methyl group, an ethyl group, and a propyl group.

Preferably used as amines are for example methylamine, ethylamine, propylamine, and the like, and methylamine is more preferably used.

The amines are preferably 0.8 to 1.2 mol based on 1 mol of dihydroxynaphthalene.

The fiber pretreatment liquid preferably contains a solvent which is not particularly limited. When the fiber pretreatment liquid includes a monomer that serves as a raw material of the thermosetting resin constituting the thermosetting resin particles, the solvent constituting the fiber pretreatment liquid preferably dissolves the monomer. The solvent is not particularly limited, and examples thereof include alcohols such as tetrahydrofuran, dioxane, dimethylformamide, and ethanol.

The amount of the solvent in the fiber pretreatment liquid is preferably 400 to 3000 parts by mass with respect to 100 parts by mass of the curable resin particles.

When the fiber pretreatment liquid includes a monomer that serves as a raw material of the thermosetting resin constituting the thermosetting resin particles, the amount of the solvent in the fiber pretreatment liquid is preferably 400 to 3000 parts by mass with respect to 100 parts by mass of the total amount of the curable resin particles and the monomers.

A method for producing the fiber pretreatment liquid will be described. Monomers that serve as a raw material for the thermosetting resin particles are dissolved in a solvent to prepare a monomer solution. This monomer solution is heated to a predetermined temperature for a predetermined time to polymerize a part of the monomers contained in the monomer solution so that the thermosetting resin particles are generated to produce a fiber pretreatment liquid. Note that, the thermosetting resin particles may exist as primary particles or may exist as aggregated secondary particles.

The average particle diameter of the thermosetting resin particles contained in the fiber pretreatment liquid is preferably 1 to 10 μm, more preferably 1.5 to 8 μm, and particularly preferably 2 to 5 μm. Note that, the average particle diameter of the thermosetting resin particles is obtained by measuring the particle diameter of the thermosetting resin particles by image processing a photograph taken with an electron microscope at a magnification of 1000 times, and the arithmetic average value of the particle diameter of each thermosetting resin particles is defined as the average particle diameter of the thermosetting resin particles. Note that, the particle diameter of the thermosetting resin particles is the smallest diameter of a true circle that can surround the thermosetting resin particles.

The conversion rate of the monomers contained in the monomer solution is preferably 20 to 90%, more preferably 30 to 80%, and particularly preferably 40 to 70%. The monomer conversion rate is a value calculated based on the following formula.

Monomer conversion rate (%)=100×mass of thermosetting resin particles

When the thermosetting resin is a naphthoxazine resin, the heating temperature of the monomer solution is preferably 30 to 80° C., more preferably 40 to 70° C., and particularly preferably 50 to 60° C.

When the thermosetting resin is a naphthoxazine resin, the heating time of the monomer solution is preferably 10 to 100 minutes, more preferably 20 to 60 minutes, and particularly preferably 30 to 50 minutes.

When the thermosetting resin is a naphthoxazine resin, the following mechanism can be considered as a polymerization mechanism of the thermosetting resin. A hydrophobic oxazine ring is formed from dihydroxynaphthalene by heating. Further, the oxazine ring is subjected to ring-opening polymerization to increase the molecular weight, thereby producing a naphthoxazine resin.

Next, the impregnated fiber bundle produced in the impregnation step is heated to carbonize the thermosetting resin particles to form carbon allotrope particles, and the cross-linking portion comprising the carbon allotrope particles cross-links between the reinforcing fibers to produce the reinforcing fiber bundles (carbonization process).

The temperature for heating the impregnated fiber bundle to carbonize the thermosetting resin particles is preferably 180 to 250° C. and more preferably 190 to 220° C. By setting the temperature for carbonization within the above range, the thermosetting resin particles can be carbonized into carbon allotrope particles without deteriorating the reinforcing fibers.

The time for heating the impregnated fiber bundle to carbonize the thermosetting resin particles is preferably 1 to 100 minutes and more preferably 2 to 20 minutes. By setting the carbonization time within the above range, the thermosetting resin particles can be carbonized into carbon allotrope particles without deteriorating the reinforcing fibers.

When the fiber pretreatment liquid contains a monomer that serves as a raw material for thermosetting resin particles, the particles of thermosetting resin, metal, silica, or thermoplastic resin included in the fiber pretreatment liquid serve as the core so that the thermosetting resin particles are easily grown between the reinforcing fibers when heating the impregnated fiber bundle. In addition, the monomer contained in the fiber pretreatment liquid may be polymerized to produce and precipitate the thermosetting resin particles without using the particles contained beforehand in the fiber pretreatment liquid as a core. The thermosetting resin particles grown using the thermosetting resin particles contained beforehand in the fiber pretreatment liquid as the core form a thermosetting resin row alone or by connecting to each other, and at the same time connect and integrate with the reinforcing fibers, and as a result, the thermosetting resin particles are sufficiently and unfailingly disposed in a state where the thermosetting resin particles are bridging among the reinforcing fibers. Further, the thermosetting resin particles grown using the thermosetting resin particles contained beforehand in the fiber pretreatment liquid as the core are connected and integrated with the reinforcing fibers via the thermosetting resin particles having a smaller diameter than those thermosetting resin particles, and as a result, the thermosetting resin particles are sufficiently and unfailingly disposed in a state where the thermosetting resin particles are bridging among the reinforcing fibers.

Thereafter, the thermosetting resin particles are carbonized to form carbon allotrope particles, whereby the reinforcing fibers are cross-linked in a more ensuring manner with the cross-linking portion including the carbon allotrope particles, and a reinforcing fiber bundle can be produced.

Next, the know-how for producing a fiber reinforced composite using a reinforcing fiber bundle is described. The fiber-reinforced composite can be produced by impregnating a reinforcing fiber bundle with a matrix resin.

The matrix resin may be either a thermosetting resin or a thermoplastic resin, but a thermoplastic resin is preferable since the fiber-reinforced composite has excellent bending elastic modulus and bending strength.

Examples of the thermoplastic resin include a polyolefin-based resin, a polyamide resin, a polycarbonate-based resin, a polyacrylic-based resin, a vinyl chloride resin, a polyether ether ketone resin, and among these, a polycarbonate-based resin, a vinyl chloride resin, and a polyolefin-based resin are preferred.

Examples of the polyolefin-based resin include a polyethylene-based resin and a polypropylene-based resin. Examples of the polyethylene-based resin include, without particular limitation, a low density polyethylene-based resin, a medium density polyethylene-based resin, a high density polyethylene-based resin, a linear low density polyethylene-based resin, a linear medium density polyethylene-based resin, and a linear high density polyethylene-based resin.

Examples of the polypropylene resin include, without particular limitation, a propylene homopolymer and a copolymer of propylene and another olefin. The copolymer of propylene and another olefin may be a block copolymer or a random copolymer.

Examples of the olefin to be copolymerized with propylene include α-olefins such as ethylene, 1-butene, 1-pentene, 4-methyl-1-pentene, 1-hexene, 1-octene, 1-nonene, and 1-decene.

Examples of the thermosetting resin include an epoxy resin, an unsaturated polyester resin, a phenol resin, a melamine resin, and a polyurethane resin, and preferred are an unsaturated polyester resin and an epoxy resin.

The method for impregnating the reinforcing fiber bundle with a matrix resin is not particularly limited. Examples thereof include a method in which a melted resin is extruded into a film form by using a sheet die and laminating onto the reinforcing fiber bundle, and subsequently conducting compression while heating to impregnate the resin matrix into the reinforcing fiber bundle.

The reinforcing fiber bundle is arranged in a state where the cross-linking portion 2 in which both ends are connected and integrated with the reinforcing fibers 1,1 in between the reinforcing fibers 1,1. Therefore, even when heat and pressure are applied to the reinforcing fiber bundle in order to impregnate the reinforcing fiber bundle with the matrix resin, the cross-linking portion 2 can unfailingly maintain the opened state of the reinforcing fiber bundle, and as a result, the reinforcing fiber bundle can be uniformly and sufficiently impregnated with the matrix resin. The obtainable fiber reinforced composite has excellent mechanical strength.

Since the cross-linking portion 2 is formed by connection of the carbon allotrope particles and/or the carbon allotrope particles to one another, there is a concave part in the connection part between the carbon allotrope particles and the reinforcing fiber bundle, and the connection part of the carbon allotrope particles themselves. In this part, the reinforcing fiber bundle can be impregnated with the matrix resin in a state where the matrix resin is locked, and the resulting fiber-reinforced composite has excellent integration with the reinforcing fiber bundle and the matrix resin and excellent mechanical strength.

In the fiber reinforced composite, the content of the reinforcing fiber bundle is preferably 10 to 70% by mass and more preferably 20 to 50% by mass. In the carbon fiber reinforced composite, the content of the matrix resin is preferably 30 to 90% by mass and more preferably 50 to 70% by mass.

By employing the configuration of the present invention, it was demonstrated that a reinforcing fiber bundle and a reinforcing fiber-opening woven fabric having excellent characteristics, and a fiber reinforced composite using the same can be produced in the Examples described later, and a reinforcing fiber bundle and a reinforcing fiber-opening woven fabric excellent in resin impregnation properties and appearance, and a fiber reinforced composite using the same are obtained. Although the detailed reason is not exactly clear, it is presumed as follows.

In other words, the conventional opening technique is a technique characterized by increasing the contact area between the fibers and the resin by spreading the fibers in the lateral direction; however the technique was not intended for expanding and opening the distance between the fibers. On the other hand, the reinforcing fiber bundle, the reinforcing fiber-opening woven fabric and the carbon fiber reinforced composite of the present invention have a three-dimensional cross-link formed between the carbon fibers by a cross-linking portion comprising a carbon allotrope different from the carbon fibers, which as a result, the distance between the fibers is expanded, and a reinforcing fiber bundle and a reinforcing fiber woven fabric excellent in resin impregnation property and appearance (gloss) were presumably obtained.

EXAMPLES

The present invention will be described in more detail with reference to the following Examples, but the present invention is not limited to the following Examples.

Example A1

<Preparation of Fiber Pretreatment Liquid>

10 parts by mass of dihydroxynaphthalene monomer, 4 parts by mass of methylamine, and 8 parts by mass of formalin (formaldehyde content: 37% by mass), and 600 parts by mass of ethanol water (ethanol content: 50% by mass) as a solvent were uniformly mixed, and the monomer was dissolved to give a monomer solution.

The monomer solution was heated to a solution temperature of 60° C. while stirring and was kept for 30 minutes, and a part of the monomer was polymerized to precipitate the naphthoxazine resin particles, whereby a pretreatment liquid comprising the naphthoxazine resin particles was prepared.

The naphthoxazine resin particles were able to be observed by taking a part of the fiber pretreatment liquid and observing using an optical microscope (product name "VH-2500" manufactured by KEYENCE).

The average particle diameter of the naphthoxazine resin particles was 3 μm. The conversion rate of the monomers contained in the monomer solution was 50%, leaving monomer residues in the fiber pretreatment liquid.

<Opening of Reinforcing Fiber Bundle>

As for a fiber bundle in which fibers are yet to be opened, a plain woven fabric (product name "EC3C" manufactured by Taiwan Plastics Co., Ltd.) was prepared which was made by plain weaving a PAN-based carbon fiber bundle (number of carbon fibers: 3000, carbon fiber diameter: 7 μm, basis weight: 200 g/m$^2$, thickness: 0.19 mm) product name.

The plain woven fabric was impregnated with a fiber pretreatment liquid to prepare an impregnated fiber bundle. The plain woven fabric was swollen by impregnating with the fiber pretreatment liquid.

The plain woven fabric was placed on a hot plate maintained at 200° C. for 3 minutes, and the solvent in the fiber pretreatment liquid was removed by evaporation. Furthermore, the monomers in the fiber pretreatment liquid were polymerized, and along with growing the naphthoxazine resin particles using the naphthoxazine resin particles contained beforehand in the fiber pretreatment liquid as a core, the naphthoxazine resin particles newly precipitated without the use of the naphthoxazine resin particles contained beforehand in the fiber pretreatment liquid as a core.

The naphthoxazine resin particles grown using the naphthoxazine resin particles contained beforehand in the fiber pretreatment liquid as a core were connected and integrated with the reinforcing fibers while forming a thermosetting resin row alone or by connecting to each other, and were arranged between the reinforcing fibers in a state where the naphthoxazine resin particles are bridged among the reinforcing fibers. Between the reinforcing fibers and the naphthoxazine resin particles were interposed a plurality of naphthoxazine resin particles having a smaller diameter than the former naphthoxazine resin particles.

Then, the naphthoxazine resin particles disposed between the reinforcing fibers were immediately carbonized to form carbonized compound particles, and a reinforcing fiber bundle was produced. Between the reinforcing fibers of the reinforcing fiber bundle, a cross-linking portion comprising the carbon allotrope particles was disposed. Both ends of the cross-linking portion were connected and integrated with the reinforcing fiber. The carbon allotrope particles were formed from an amorphous carbon.

Figure 6:
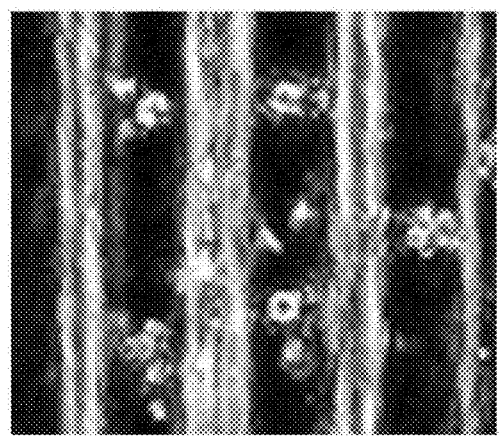
FIG. 6 is a micrograph showing the reinforcing fiber bundle produced in Example A1.
Figure 7:
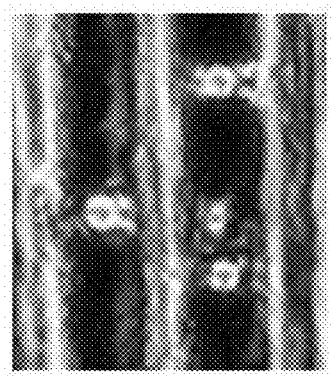
FIG. 7 is a micrograph showing the reinforcing fiber bundle produced in Example A1.

Enlarged photographs of the obtained reinforcing fiber bundles observed with an optical microscope (product name "VH-2500" manufactured by KEYENCE Inc.) are shown in FIGS. 6 and 7.

In the reinforcing fiber bundle, the average particle diameter of the carbon allotrope particles was 3 μm. The average particle diameter of the carbon allotrope particles with large-diameter was 5 μm. The average particle diameter of the carbon allotrope particles with small-diameter was 1 μm. The average number of carbon allotrope particles constituting the cross-linking portion was three. The thickness of the reinforcing fiber bundle was 0.21 mm when measured using a digital micrometer (product name "EA725EB11" manufactured by Esco Corporation).

<Preparation of Fiber Reinforced Composite>

Next, a methacrylic resin (product name "MH" manufactured by Sumitomo Chemical Co., Ltd.) was prepared as a matrix resin and was extruded into a film, and after laminating the molten methacrylic resin film on the reinforcing fiber bundle, it was compressed for 3 minutes at a pressure of 1 MPa while being heated to 250° C. so that the reinforced resin bundle was impregnated with the methacrylic resin, and as a result, a fiber reinforced composite having a thickness of 250 μm was obtained. In the fiber reinforced composite, the content of the reinforcing fiber bundle was 40% by mass.

Comparative Example A1

20 parts by mass of 50% by mass ethanol water (product name "057-00456" manufactured by Wako Pure Chemical Industries, Ltd.), 2.0 parts by mass of 1,5-dihydroxynaphthalene (product name "048-02342" manufactured by Wako Pure Chemical Industries, Ltd.), 1.0 part by weight of 40% by mass aqueous methylamine solution (product name "132-01857" manufactured by Wako Pure Chemical Industries, Ltd.), and 2.0 parts by mass of 37% by mass of aqueous formaldehyde solution (product name "064-00406" manufactured by Wako Pure Chemical Industries, Ltd.) were introduced into a beaker in this order and stirred to prepare a monomer solution.

After bringing a plain woven fabric (product name "EC3C" manufactured by Taiwan Plastic Co., Ltd.) into contact with the monomer solution, the plain woven fabric was impregnated with the monomer solution by pinching with a rubber roller.

Next, the plain woven fabric was placed in a hot air oven set at 70° C. and heated for 3 minutes in a state where the plain woven fabric was sandwiched between two polyethylene terephthalate films (product name "G2-100" manufactured by Teijin Limited).

When the plain fabric was removed from the polyethylene terephthalate film and visually confirmed, the plain fabric was found to be in a wet state with the solvent remaining without being evaporated.

Next, the plain woven fabric was left in a hot air oven set at 170° C. for 20 minutes to remove the solvent, and a reinforcing fiber bundle was obtained. The thickness of the reinforcing fiber bundle was measured using a digital micrometer (product name "EA725EB11" manufactured by Esco Corporation) and was found to be 0.19 mm.

Figure 8:
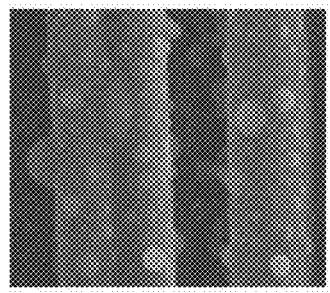
FIG. 8 is a micrograph showing the reinforcing fiber bundle produced by Comparative Example A1.

An enlarged photograph of the obtained reinforcing fiber bundle observed with an optical microscope (product name "VH-2500" manufactured by KEYENCE Inc.) is shown in FIG. 8.

Although the carbon allotropes were hemispherically adhered to and integrated with the surface of the reinforcing fiber bundles, the carbon allotropes were not in a state of bridging among the reinforcing fibers to each other.

A fiber reinforced composite was produced in the same manner as in Example A1 using the obtained reinforcing fiber bundle.

The bending elastic modulus and bending strength of the obtained fiber reinforced composite were measured in the following manner, and the results are shown in Table A1.
(Bending Elastic Modulus and Bending Strength)

A fiber reinforced composite was thermally fused and integrated with both faces of a polyvinyl chloride plate (Takiron Co., Ltd., thickness: 4 mm) to prepare a laminate. The bending elastic modulus and bending strength of the obtained laminate were measured according to JIS K7074. Note that, when the bending elastic modulus and bending strength of the commercially available polyvinyl chloride plate (thickness: 3 mm) were measured based on JIS K7074, they were 3194 MPa and 93 MPa.

TABLE A1

|  | Bending Elastic Modulus (MPa) | Bending Strength (MPa) |
| --- | --- | --- |
| EX. A1 | 6326 | 173 |
| COMP. EX. A1 | 5804 | 160 |

Example B1

<Preparation of Fiber Pretreatment Liquid>

Firstly, 10 parts by mass of 1,5-dihydroxynaphthalene monomer (product name "048-02342" manufactured by Wako Pure Chemical Industries, Ltd.), 4 parts by mass of 40% by mass aqueous methylamine solution (product name "132-01857", manufactured by Wako Pure Chemical Industries, Ltd.), and 8 parts by mass of 37% by mass aqueous formaldehyde solution (product name "064-00406", manufactured by Wako Pure Chemical Industries, Ltd.), was uniformly mixed with 600 parts by mass of 50% by mass ethanol water (product name "057-00456", manufactured by Wako Pure Chemical Industries, Ltd.) as a solvent to prepare a monomer solution.

Next, the monomer solution was heated so that the solution temperature reaches 60° C. and maintained for 30 minutes while stirring, and a part of the monomer was polymerized to precipitate naphthoxazine resin particles, and as a result, a fiber pretreatment liquid comprising the naphthoxazine resin particles was prepared.

When a part of the fiber pretreatment liquid was taken and observed using an optical microscope (product name "VH-2500" manufactured by KEYENCE), it was possible to observe the naphthoxazine resin particles.

The average particle diameter of the naphthoxazine resin particles was 3 μm. The conversion rate of the monomers contained in the monomer solution was 50%, leaving the monomers behind in the fiber pretreatment liquid.
<Preparation of Reinforcing Fiber Woven Fabric>

PAN-based carbon fiber bundle (number of bundles: 3000, fiber diameter: 7 μm, basis weight: 200 g/m$^2$) was used as a fiber bundle in which fibers are yet to be opened, and a commercial plain woven fabric (a carbon fiber woven fabric manufactured by Taiwan Plastics Co., Ltd., product name "EC3C") was prepared which was obtained by plain weaving these bundles.

The thickness (width) in the horizontal direction of the fiber bundle constituting the plain woven fabric was 1.50 mm (average value of 10 locations) for both the warp width and the weft width. The horizontal thickness (width) was measured by image processing using an optical microscope (product name "VH-2500" manufactured by KEYENCE Corp.) (the same applies hereinafter).

Further, the thickness in the vertical direction of the fiber bundle constituting the plain woven fabric was 0.19 mm (average value of 10 locations). The thickness in the vertical direction was measured using a digital micrometer (product name "EA725EB11" manufactured by Esco Corporation) (the same applies hereinafter).
<Production and Evaluation of Reinforcing Fiber Woven Fabric>

Firstly, the above-mentioned plain woven fabric was impregnated with the above-mentioned fiber pretreatment liquid to produce a carbon fiber woven fabric comprising the impregnated fiber bundle. In this Example, the impregnation step is a step of bringing the carbon fiber woven fabric into contact with a fiber pretreatment liquid comprising a monomer that generates a thermosetting resin by a polymerization reaction. Specifically, a plain woven fabric composed of fiber bundles was brought into contact with the fiber pretreatment liquid, and then by pinching with a rubber roller, the plain woven fabric was impregnated with the fiber pretreatment liquid. Then, a process of pulling with a roll in the horizontal direction was performed. By visual observation, it was found that impregnation of the fiber pretreatment liquid in this way allowed the fiber bundle absorb the treatment liquid by surface tension and swell, and then by performing treatment with a roller in the horizontal direction, the fiber bundle opened in the horizontal direction. Accordingly, the fiber pretreatment liquid can be referred to as a fiber opening solution in this embodiment.

Subsequently, a further opening process by heat processing was performed. The detail is as follows.

Firstly, a plain woven fabric comprising the impregnated fiber bundles was placed on a hot plate maintained at 200° C. for 3 minutes to evaporate and remove the solvent in the fiber pretreatment liquid, and at the same time, growing and carbonization of the naphthoxazine resin particles occurred, and as a result, a carbon fiber made fiber-opening woven fabric comprising amorphous carbon particles was obtained.

Next, the naphthoxazine resin particles grown using the naphthoxazine resin particles contained beforehand in the fiber pretreatment liquid as a core formed a thermosetting resin row alone or by connecting to each other, and at the same time, connected and integrated with the reinforcing fibers, so that the naphthoxazine resin particles were disposed between the reinforcing fibers in a state where the naphthoxazine resin particles were bridging among the reinforcing fibers. Between the reinforcing fibers and the naphthoxazine resin particles were interposed a plurality of naphthoxazine resin particles having a smaller diameter than the former naphthoxazine resin particles.

The naphthoxazine resin particles disposed between the reinforcing fibers were immediately carbonized to form carbonized compound particles, and a reinforcing fiber bundle was produced. Between the reinforcing fibers of the reinforcing fiber bundle, a cross-linking portion comprising the carbon allotrope particles was disposed. Both ends of the cross-linking portion were connected and integrated with the reinforcing fiber. The carbon allotrope particles were formed from an amorphous carbon.

When the obtained reinforcing fiber bundle (which constitutes the carbon fiber-opening woven fabric) was observed using an optical microscope (product name "VH-2500" manufactured by KEYENCE), the average particle diameter of the carbon allotrope particles was 3 μm. The average particle diameter of the carbon allotrope particles with large-diameter was 5 μm. The average particle diameter of the carbon allotrope particles with small-diameter was 1 μm. The average number of carbon allotrope particles constituting the cross-linking portion was three.

Figure 9:
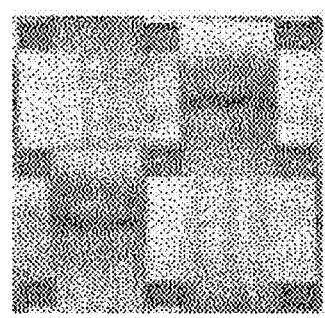
FIG. 9 is a micrograph of the reinforcing fiber woven fabric comprised from the fiber bundle before fiber opening process used in Example B1.
Figure 10:
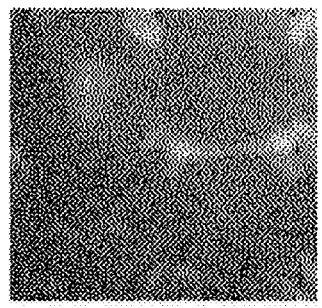
FIG. 10 is a micrograph of reinforcing fiber-opening woven fabric produced by Example B1.

FIGS. 9 and 10 show micrographs of the reinforcing fiber woven fabric composed of the fiber bundles before the fiber opening treatment and the reinforcing fiber woven fabric of the present invention composed of the reinforcing fiber bundles after the fiber opening treatment, respectively. As shown in FIG. 10, it can be seen that the warp bundle and the weft bundle are in close contact with the almost adjacent fiber bundle by the fiber opening treatment.

As described above, in this Example, since the carbon fiber woven fabric was subjected to the fiber opening treatment and was in the opened state, it can be referred to as a carbon fiber-opening woven fabric.

The horizontal thickness (width) of the obtained reinforcing fiber bundle constituting the dried carbon fiber-opening fabric was 1.99 mm (average of 10 locations) for both the warp and weft widths, which was increased by 0.49 mm compared with that before the fiber opening treatment.

Moreover, the thickness in the vertical direction of the obtained reinforcing fiber bundle constituting the dried carbon fiber-opening fabric is 0.21 mm (average value of 10 locations), and interestingly, the thickness increased compared to before opening treatment as like in the horizontal direction. Normally, after the yarn bundle (fiber bundle) is opened in the horizontal direction, the number of single fibers laminated in the vertical direction is reduced, so the thickness in the vertical direction is considered to decrease; however as described above, in the opening treatment of the present Example, it was found that the thickness of the fiber bundle increased also in the vertical direction from 0.19 mm as of before the opening treatment to 0.21 mm as of after the opening treatment.

This is presumably because the naphthoxazine resin being a heat-resistant high-strength resin synthesized by the above heat treatment, fixed and held in between the fibers in an opened state.

Comparative Example B1

A carbon fiber woven fabric was prepared and evaluated in the same procedure as in Example B1, except that 600 g of 50% by mass ethanol water was used as the fiber pretreatment liquid.

The thickness (width) of the dried reinforcing fiber bundle obtained in Comparative Example B1 in the horizontal direction was 1.99 mm (average value of 10 locations) for both the warp and weft widths, compared to that before the treatment, and increased by 0.49 mm.

The thickness of the dried reinforcing fiber bundle obtained in Comparative Example B1 in the vertical direction was 0.16 mm (average value of 10 locations), which was smaller than that before the treatment. Usually, after the yarn bundle (fiber bundle) is opened in the horizontal direction, the thickness in the vertical direction is expected to decrease because the number of single fibers laminated in the vertical direction is reduced; therefore, as expected, in the treatment of Comparative Example B1, it was found that the thickness of the fiber bundle in the vertical direction decreased from 0.19 mm as of before treatment to 0.16 mm as of after treatment.

This is presumably because, unlike Example B1, in between the fibers were in an opened stated and not fixed and stably held.

Reference Example B1

A carbon fiber woven fabric was prepared and evaluated in the same procedure as in Example 1 except that the fiber pretreatment liquid used in Comparative Example A1 was used.

When the obtained reinforcing fiber bundle was observed in the same manner as in Example 1, the carbon allotropes were hem ispherically attached to and integrated with the surface of the reinforcing fiber bundles; however the carbon allotrope were found not in a state of cross-linking the reinforcing fibers together.

The thickness (width) in the horizontal direction of the reinforcing fiber bundle after drying obtained in Reference Example B1 is 1.99 mm (average value of 10 locations) for both the warp width and the weft width, and increased by 0.49 mm compared to that before the treatment.

Moreover, the thickness in the vertical direction of the dried reinforcing fiber bundle obtained in Reference Example 1 was 0.16 mm (average value of 10 locations), which was smaller than that before the treatment. Normally, after the yarn bundle (fiber bundle) is opened in the horizontal direction, the thickness in the vertical direction is expected to decrease because the number of single fibers stacked in the vertical direction is reduced; therefore, as expected, in the treatment of this comparative example, it was found that the thickness of the fiber bundle in the vertical direction decreased from 0.19 mm as of before the treatment to 0.16 mm as of after the treatment.

This is presumed to be because in between the fibers were in an opened stated and not fixed and stably held since unlike Example B1, there is no naphthoxazine resin synthesized, the heat-resistant high-strength resin.

Example B2

<Production of Carbon Fiber Reinforced Composite>

Polypropylene (PP) resin (product name "J108M" manufactured by Prime Polymer Co., Ltd.) was used as a matrix resin.

After the polypropylene resin was extruded into a film and the molten polypropylene resin film was laminated on the reinforcing fiber bundle constituting the carbon fiber-opening woven fabric obtained in Example 1, the film was compressed at a pressure of 1 MPa while heating at 250° C., and the reinforcing fiber bundle was impregnated with the polypropylene resin to obtain a carbon fiber reinforced composite having a thickness of 250 μm. The content of reinforcing fibers in the carbon fiber reinforced composite was 50% by mass.

<Bending Elastic Modulus and Bending Strength>

A plurality of the above-mentioned carbon fiber reinforced composites was stacked and thermally fused and integrated to produce a laminate. The bending elastic modulus and bending strength of the obtained laminate were measured according to JIS K7074.

The results are shown in Table B1. As is clear from Table B1, it was demonstrated that the carbon fiber reinforced composite of Example B2 has superior bending elastic modulus and bending strength as compared with the carbon fiber composite of Comparative Example B2 described later.

Comparative Example B2

A carbon fiber composite was prepared in the same manner as in Example B2 using the same matrix resin as in Example B2, except that the carbon fiber woven fabric obtained in Comparative Example B1 was used, and the bending elastic modulus and bending strength of the obtained laminate by use of this carbon fiber composite were measured.

The results are shown in Table B1. As is clear from Table B1, it was shown that the carbon fiber composite of Comparative Example B2 was inferior in terms of bending elastic modulus and bending strength as compared with the carbon fiber reinforced composite of Example B2.

Example B3

<Production of Carbon Fiber Reinforced Composite>

A polycarbonate (PC) resin (manufactured by Sumitomo Acrylic Sales Co., Ltd., film thickness: 75 μm, product number "C000") was used as a matrix resin.

The polycarbonate resin was laminated on the reinforcing fiber bundles constituting the carbon fiber-opening woven fabric obtained in Example B1, and then compression was conducted at a pressure of 1 MPa for 3 minutes while heating to 250° C. to impregnate the reinforcing fiber bundles with the polycarbonate resin into, and as a result, a carbon fiber reinforced composite having a thickness of 250 μm was obtained. In the carbon fiber reinforced composite, the content of reinforcing fibers was 50% by mass.

<Bending Elastic Modulus and Bending Strength>

A plurality of the above-mentioned carbon fiber reinforced composites was stacked and thermally fused and integrated to produce a laminate. The bending elastic modulus and bending strength of the obtained laminate were measured according to JIS K7074.

The results are shown in Table B1. As is clear from Table B1, it was demonstrated that the carbon fiber reinforced composite of Example B3 has superior bending elastic modulus and bending strength as compared with the carbon fiber composite of Comparative Example B3 described later.

Comparative Example B3

A carbon fiber composite was prepared in the same manner as in Example B3 using the same matrix resin as in Example B3 except that the carbon fiber woven fabric obtained in Comparative Example B1 was used, and the bending elastic modulus and bending strength of the obtained laminate by use of this carbon fiber composite were measured.

The results are shown in Table B1. As is clear from Table B1, it was shown that the carbon fiber composite of Comparative Example B3 was inferior in terms of bending elastic modulus and bending strength as compared with the carbon fiber reinforced composite of Example B3.

Example B4

<Preparation of Carbon Fiber Reinforced Composite>

A polymethyl methacrylate (PMMA) resin film (manufactured by Sumitomo Acrylic Sales Co., Ltd., film thickness: 75 μm, product number "S001G") was used as a matrix resin.

The polymethyl methacrylate resin film was laminated on the reinforcing fiber bundles constituting the carbon fiber-opening fabric obtained in Example B1, and then compression was conducted at a pressure of 1 MPa for 3 minutes while heating to 250° C. to impregnate the reinforcing fiber bundles with the polymethyl methacrylate resin, and as a result, a carbon fiber reinforced composite having a thickness of 250 μm was obtained. In the carbon fiber reinforced composite, the content of reinforcing fibers was 50% by mass.

<Bending Elastic Modulus and Bending Strength>

A plurality of the above-mentioned carbon fiber reinforced composites was stacked and thermally fused and integrated to produce a laminate. The bending elastic modulus and bending strength of the obtained laminate were measured according to JIS K7074.

The results are shown in Table B1. As is clear from Table 1, it was demonstrated that the carbon fiber reinforced composite of Example B4 had superior bending elastic modulus and bending strength as compared with the carbon fiber composite of Comparative Example B4 described later.

Comparative Example B4

A carbon fiber composite was prepared in the same manner as in Example B4 using the same matrix resin as in Example B4, except that the carbon fiber woven fabric obtained in Comparative Example B1 was used, and the bending elastic modulus and bending strength of the obtained laminate by use of this carbon fiber composite were measured.

The results are shown in Table B1. As is clear from Table B1, it was shown that the carbon fiber composite of Comparative Example B4 was inferior in terms of bending elastic modulus and bending strength as compared with the carbon fiber reinforced composite of Example B4.

TABLE B1

|  | Matrix Resin | Bending Elastic Modulus (MPa) | Bending Strength (MPa) |
|---|---|---|---|
| EX. B2 | PP | 44229 | 302 |
| EX. B3 | PC | 41547 | 483 |
| EX. B4 | PMMA | 37218 | 388 |
| COMP. EX. B2 | PP | 26397 | 138 |
| COMP. EX. B3 | PC | 35580 | 299 |
| COMP. EX. B4 | PMMA | 28778 | 175 |

Example C1-1

<Preparation of Carbon Fiber Woven Fabric>

12K carbon fiber woven fabric 1: a woven fabric made by twill weaving and plain weaving PAN-based carbon fiber bundles (number of filaments: 12,000) having basis weight of 400 g/m$^2$ and thickness of 0.575 mm (product name "ECCN" manufactured by Taiwan Plastics Co., Ltd.) and 12K carbon fiber woven fabric 2: a woven fabric made by plain weaving PAN-based carbon fiber bundles (number of filaments: 12,000) having basis weight of 192 g/m$^2$ and thickness of 0.21 mm (product name "Torayca Cloth CK6273C" manufactured by Toray Industries, Inc.) were prepared.

<Preparation of Thermoplastic Resin>

A PP resin film produced by mixing 100 parts by mass of polypropylene (PP) resin (manufactured by Prime Polymer Co., Ltd., product name "J108M") and 10 parts by mass of maleic acid-modified polypropylene (manufactured by Sanyo Chemical Industries, Ltd., product name "Yumex 1010") and melt-kneading the mixture with an extruder, and a polycarbonate (PC) resin film (product name "Technoloy C000" manufactured by Sumitomo Chemical Co., Ltd.) were prepared.

To the 12K carbon fiber woven fabric 1, five layers of PP resin films as a matrix resin were laminated above and underneath. The size of the laminate was 200×200 mm and the thickness was 2 mm.

Next, the laminated body was placed in a square-shaped spacer having a hole with an inner dimension of 200×200 mm squares was heated from room temperature to 200° C. using a flat plate mold, and was kept for 10 minutes at 200° C., and further heating and pressing were performed at a pressure of 2 MPa for 10 minutes. Then, the laminated body was cooled over for about 30 minutes while maintaining the same pressure, and the metal mold die was opened and released, whereby a prepreg was obtained.

In the prepreg, the part having the largest pitch width was measured with a ruler, including the longitudinal direction and the lateral direction. The results are shown in Table C1.

Example C1-2

A prepreg was produced under the same conditions as in Example C1-1 except that the matrix resin was changed to a PC resin film and the mold temperature was changed to 270° C. The measurement result of the pitch width is shown in Table C1.

Comparative Example C1-1

A prepreg was produced under the same conditions as in Example C1-1 except that the carbon fiber woven fabric was changed to 12K carbon fiber woven fabric 2. The measurement result of the pitch width is shown in Table C1.

Comparative Example C1-2

A prepreg was produced under the same conditions as in Example C1-2 except that the carbon fiber woven fabric 2 was changed to 12K carbon fiber woven fabric 2. The measurement result of the pitch width is shown in Table C1.

TABLE C1

|  |  | Carbon Fiber Fabric | | |
|---|---|---|---|---|
|  | Resin Film | Variety | Base Weight (g/m$^2$) | Pitch Width (mm) |
| EX. C1-1 | PP | 12K Twill | 400 | 4.1 |
| COMP. EX. C1-1 | PP | 12K Plain | 192 | 7.7 |
| EX. C1-2 | PC | 12K Twill | 400 | 4.1 |
| COMP. EX. C1-2 | PC | 12K Plain | 192 | 7.4 |

The pitch width of the carbon fiber woven fabric 1 before press molding was uniformly about 4 mm, and the pitch width of the woven fabric 2 is uniformly about 7.5 mm; however misalignment occurred in Comparative Examples C1-1 and C1-2 using the woven fabrics having a basis weight of 200 g/m$^2$. On the other hand, in Examples C1-1 and C1-2 using the woven fabrics having a basis weight of 400 g/m$^2$, there was almost no misalignment and both pitch widths were 4.1 mm. From the above results, it became clear that the design of the carbon fiber woven fabric can be maintained by setting the basis weight above a specific numerical value.

Example C2-1

<Preparation of Impregnating Solution for Opening>

10 parts by mass of 1,5-dihydroxynaphthalene monomer (product name "048-02342" manufactured by Wako Pure Chemical Industries, Ltd.), 4 parts by mass of methylamine (product name "132-01857", manufactured by Wako Pure Chemical Industries, Ltd.), and 8 parts by mass of formalin (formaldehyde content: 37% by mass, product name "064-00406", manufactured by Wako Pure Chemical Industries, Ltd.) was mixed uniformly with 600 parts by mass of ethanol water (ethanol content: 50% by mass, product name "057-00456" manufactured by Wako Pure Chemical Industries, Ltd.) as a solvent to prepare an impregnating solution for opening in which the monomer was dissolved.

While stirring the impregnating solution for opening, the solution temperature was heated to 60° C. and was maintained for 30 minutes to polymerize a part of the monomer, and the naphthoxazine resin particles were precipitated to form an impregnating solution for opening comprising the naphthoxazine resin particles.

A part of the impregnating solution for opening was taken and observed using an optical microscope (product name "VHX-6000" manufactured by KEYENCE Inc.), and the naphthoxazine resin particles were able to be observed. The average particle diameter of the naphthoxazine particles at given 20 places was 2 μm. Moreover, the conversion rate of the monomer contained in the monomer solution was 50%, and the monomer remained in the impregnating solution for opening.

<Preparation of Opened Carbon Fiber Bundle>

An impregnated fiber bundle was prepared by impregnating the 12K carbon fiber woven fabric 1 with the impregnating solution for opening. The 12K carbon fiber woven fabric 1 was swollen by impregnating the impregnating solution for opening.

The 12K carbon fiber woven fabric 1 was placed on a hot plate maintained at 200° C. for 3 minutes, and the solvent in the impregnating solution for opening was removed by evaporation. Further, the monomers in the impregnating solution for opening were polymerized along with growing the naphthoxazine resin particles using the naphthoxazine resin particles contained beforehand in the impregnating solution for opening as a core, and the naphthoxazine resin particles newly precipitated without the use of the naphthoxazine resin particles contained beforehand in the fiber pretreatment liquid as a core.

The naphthoxazine resin particles grown using the naphthoxazine resin particles contained beforehand in the impregnating solution for opening as a core formed a thermosetting resin row alone or by connecting to each other, and at the same time, connected and integrated with the reinforcing fibers, and as a result, the naphthoxazine resin particles were disposed in a state where the naphthoxazine resin particles were bridging among the carbon fibers. Between the carbon fibers and the naphthoxazine resin particles were interposed a plurality of naphthoxazine resin particles having a smaller diameter than the former naphthoxazine resin particles.

The naphthoxazine resin particles disposed between the carbon fibers were immediately carbonized to produce an opened carbon fiber bundle comprising carbon isotope particles. Between the carbon fibers of the carbon fiber bundle, a cross-linking portion comprising carbon allotrope particles was disposed. Both ends of the cross-linking portion were connected and integrated with the carbon fiber. The carbon allotrope particles were formed from carbon allotropes. The average particle diameter of the carbon allotrope particles was 3 μm.

<Manufacture and Evaluation of Fiber Reinforced Composite Material>

Next, five layers of the above-described PP resin film and 12K carbon fiber woven fabric 1 were superimposed, heated from room temperature to 200° C., held at 200° C. for 10 minutes, and further heated and pressurized for 10 minutes at a pressure of 2 MPa. Then, it was cooled over about 30 minutes, maintaining the same pressure, thereby obtaining a fiber reinforced composite material.

The bending elastic modulus and bending strength of the obtained laminate were measured according to JIS K7074. The measurement results were as shown in Table C2 below.

Example C2-2

A impregnating solution for opening was prepared by the same method as Example C2-1 except that the impregnating solution for opening prepared in Example C2-1 was changed to 12 parts of 1,5-dihydroxynaphthalene, 11 parts of methylamine, and 6 parts of formalin.

A part of the impregnating solution for opening obtained above was diluted with 50% aqueous ethanol solution and a small amount thereof was collected and dropped on a preparation, and after evaporating the solvent, the shape and dispersibility of the particles were confirmed by means of an optical microscope (device name "VHX-6000" manufactured by KEYENCE Inc.). As a result, each particle (primary particle) had a shape close to a perfect sphere, and although some portions were observed where about 20 primary particles were aggregating, good dispersibility was exhibited overall. The particle diameter of the particles was measured with a laser diffraction particle diameter distribution analyzer (product name "SALD-2200", manufactured by Shimadzu Corporation), and as a result, the median diameter (D50) which is the average particle diameter was 3.1 μm.

<Preparation of Opened Carbon Fiber Bundle>

An opened carbon fiber bundle was produced in the same manner as in Example C2-1 except that the impregnating solution for opening produced in Example C2-2 was used. The average particle diameter of the carbon allotrope particles was 4 μm.

A fiber reinforced composite material was produced in the same manner as in Example C2-1 except that the opened carbon fiber bundle produced in Example C2-2 was used to obtain a laminate. The bending elastic modulus and bending strength of the obtained laminate were measured in the same manner as in Example 2-1. The measurement results were as shown in Table C2 below.

Example C2-3

<Preparation of Impregnating Solution for Opening>

10 parts by mass of 1,5-dihydroxynaphthalene monomer, 4 parts by mass of 40% by mass of aqueous methylamine solution, and 8 parts by mass of formalin (formaldehyde content: 37% by mass) was uniformly mixed with 600 parts by mass of ethanol water (ethanol content: 50% by mass) as a solvent to prepare an impregnating solution for opening by dissolving the monomer.

Next, 20 parts by mass of silica particles (manufactured by JGC Catalysts & Chemicals Co., Ltd., product name "ESPHERIQUE N150", average particle diameter 10 μm, specific surface area 5 $m^2/g$) were added to the impregnating solution for opening.

<Preparation of Opened Carbon Fiber Bundle>

Subsequently, a 12K carbon fiber woven fabric 1 was prepared, dipped in the above-described impregnating solution for opening and then pulled up, thereafter being heated at 200° C. for 2 minutes. This heating caused polymerization reaction and carbonization of the naphthoxazine resin, and carbon allotropes derived from the naphthoxazine resin were generated, and as a result, an opened carbon fiber bundle was obtained. The total adhesion amount of the silica particles and the carbon allotropes in the opened carbon fiber bundle was 1% by mass. The average particle diameter of the coated particles was 6 μm.

<Production and Evaluation of Fiber Reinforced Composite Material>

A fiber reinforced composite material was produced in the same manner as in Example C2-1 except that the opened carbon fiber bundle produced in Example C2-3 was used to obtain a laminate. The bending elastic modulus and bending strength of the obtained laminate were measured in the same manner as in Example C2-1. The measurement results were as shown in Table C2 below.

Comparative Example C2-1

<Production and Evaluation of Fiber Reinforced Composite Material>

A prepreg was produced in the same manner as in Example C2-3 except that the 12K carbon fiber woven fabric 1 that was not subjected to the fiber opening treatment was used.

A fiber reinforced composite material was produced in the same manner as in Example C2-1 except that the carbon fiber bundle produced in Comparative Example C2-1 was used to obtain a laminate. The bending elastic modulus and bending strength of the obtained laminate were measured in the same manner as in Example C2-1. The measurement results were as shown in Table C2 below. In the table, RCF represents the carbon fiber content (% by volume) in the fiber-reinforced composite material.

TABLE C2

| | $R_{CF}$ (vol. %) | Theoretical Bending Elastic Modulus (GPa) | Bending Elastic Modulus (GPa) | Bending Elastic Modulus/ Theoretical Bending Elastic Modulus | Bending Strength (MPa) |
|---|---|---|---|---|---|
| EX. C2-1 | 44 | 51.5 | 27.7 | 0.538 | 106 |
| EX. C2-2 | 44 | 51.5 | 42.0 | 0.816 | 176 |
| EX. C2-3 | 50 | 61.7 | 57.0 | 0.796 | 426 |
| COMP. EX. C2-1 | 50 | 51.5 | 20 | 0.497 | 65 |

From the above evaluation results, it was revealed that the laminate using a woven fabric made of an opened carbon fiber bundle (Examples C2-1 to C2-3) had improved mechanical strength while maintaining the design properties compared to the laminates using a woven fabric made of an unopened carbon fiber bundle (Comparative Example C2-1). In addition, it was revealed that the laminates using the opened carbon fiber bundles (Examples C2-2 and C2-3) opened by large spacer particles had more improved ratio of bending elastic modulus to theoretical bending elastic modulus than the laminate of Example C2-1, and the mechanical strength was remarkably improved. This is considered to be because the carbon fiber bundle was sufficiently opened by the large spacer particles, and the impregnation property of the matrix resin was improved.

Example C3-1

A fiber-reinforced composite material was produced in the same manner as in Example C2-1 except that the PP resin film was changed to a PC resin film and the mold temperature was changed to 270° C.

A plurality of the obtained fiber reinforced composite materials was stacked and integrated by heat fusion to produce a laminate. The bending elastic modulus and bending strength of the obtained laminate were measured according to JIS K7074. The measurement results were as shown in Table C3 below.

Example C3-2

A fiber reinforced composite material was produced in the same manner as in Example C2-2 except that the PP resin film was changed to a PC resin film and the mold temperature was changed to 270° C., and a laminate was obtained. The bending elastic modulus and bending strength of the obtained laminate were measured in the same manner as in Example C3-1. The measurement results were as shown in Table C3 below.

Example C3-3

A fiber reinforced composite material was produced in the same manner as in Example C2-3 except that the PP resin film was changed to a PC resin film and the mold temperature was changed to 270° C., and a laminate was obtained. The bending elastic modulus and bending strength of the obtained laminate were measured in the same manner as in Example C3-1. The measurement results were as shown in Table C3 below.

Comparative Example C3-1

A fiber reinforced composite material was produced in the same manner as in Comparative Example C2-1 except that the PP resin film was changed to a PC resin film and the mold temperature was changed to 270° C., and a laminate was obtained. The bending elastic modulus and bending strength of the obtained laminate were measured in the same manner as in Example C3-1. The measurement results were as shown in Table C3 below. In the table, RCF represents the carbon fiber content (% by volume) in the fiber-reinforced composite material.

TABLE C3

| | $R_{CF}$ (vol. %) | Theoretical Bending Elastic Modulus (GPa) | Bending Elastic Modulus (GPa) | Bending Elastic Modulus/ Theoretical Bending Elastic Modulus | Bending Strength (MPa) |
|---|---|---|---|---|---|
| EX. C3-1 | 47 | 55.4 | 35.6 | 0.643 | 214 |
| EX. C3-2 | 50 | 58.8 | 49.4 | 0.840 | 438 |
| EX. C3-3 | 51 | 50.9 | 55.2 | 1.01 | 674 |
| COMP. EX. C3-1 | 51 | 50.9 | 28.2 | 0.589 | 179 |

From the above evaluation results, even when the matrix resin was changed to the PC resin, it was revealed that the laminate using the opened carbon fiber bundle had improved ratio of the bending elastic modulus to the theoretical bending elastic modulus, as in the results shown in Table C2, and the mechanical strength was remarkably improved while maintaining the design.

Example D1

<Production of Opened Carbon Fiber Bundle>

10 parts by mass of 1,5-dihydroxynaphthalene monomer, 4 parts by mass of 40% by mass aqueous methylamine solution, and 8 parts by mass of formalin (formaldehyde content: 37% by mass) was uniformly mixed with 800 parts by mass of ethanol water (ethanol content: 50% by mass) as a solvent to obtain a monomer solution in which the monomers are dissolved.

Next, 10 parts by mass of particles of a divinylbenzene cross-linking polymer (manufactured by Sekisui Chemical Co., Ltd., product name "Micropearl SP", average particle diameter of 3 μm) were added to the monomer solution to prepare a impregnating solution for opening.

Subsequently, a carbon fiber fabric composed of PAN-based carbon fiber bundles (number of carbon fibers: 3000, average diameter of carbon fibers: 7 μm, basis weight: 200 g/m², thickness: 0.19 mm, plain weave) was prepared, immersed in the impregnating solution for opening as above, and then pulled up, and thereafter it was heated at 200° C. for 2 minutes. This heating caused polymerization reaction and carbonization of the naphthoxazine resin, and amorphous carbons derived from the naphthoxazine resin were generated, and as a result, an opened carbon fiber bundle was obtained. The total adhesion amount of the organic particles and the carbon allotropes in the opened carbon fiber bundle was 1% by mass.

<Production and Evaluation of Carbon Fiber Reinforced Composite>

Polycarbonate (PC) resin (product name "TECHNOLLOY C000" manufactured by Escarbo Sheet Co., Ltd.) was used as a matrix resin. The polycarbonate resin was extruded into a film, and the molten polycarbonate resin film was laminated on the woven fabric composed of the opened carbon fiber bundles obtained above, and thereafter compression was conducted at a pressure of 3 MPa for 15 minutes while heating to 270° C. to impregnate the opened carbon fiber bundle with the polycarbonate resin, and as a result, a carbon fiber reinforced composite having a thickness of 400 μm was obtained. In the carbon fiber reinforced composite, the carbon fiber content was 50% by volume.

A plurality of the obtained carbon fiber reinforced composites was stacked and heat-bonded together to produce a laminate. A simple bending test device (indenter: diameter 4 mm, test method: 3-point bending test) formed by combining a lever-type small manual measuring (manufactured by Imada Co., Ltd., stand model number: SVL-1000N) and a digital force gauge (manufactured by Imada Co., Ltd. model number: DSV-1000N) was used to measure the bending strength of the obtained laminate. The measured specimens had a thickness of 0.4 mm to 0.5 mm, a width of 15 mm, and a length of 40 mm, and five specimens were measured with a distance between supporting points of 16 mm, and the bending stress was calculated from the obtained maximum test force. The measurement results were as shown in Table D1 below.

Example D2

<Preparation of Opened Carbon Fiber Bundle>

A woven fabric composed of an opened carbon fiber bundles was produced in the same manner as in Example D1, except that particles made of a divinylbenzene cross-linking polymer having an average particle diameter of 10 μm (product name "Micropearl SP" manufactured by Sekisui Chemical Co., Ltd.) were used. The total adhesion amount of the organic particles and the carbon allotropes in the opened carbon fiber bundle was 1% by mass. Moreover, as a result of measuring the diameter of the coating organic particles at given 10 points in an optical microscope image, the average was 11 μm.

<Production and Evaluation of Carbon Fiber Reinforced Composite>

A carbon fiber reinforced composite was produced in the same manner as in Example D1, except that the woven fabric composed of the opened carbon fiber bundle of Example D2 was used. A laminate was prepared from the carbon fiber reinforced composite of Example D2 in the same manner as in Example D1, and the bending strength was measured. The measurement results were as shown in Table D1 below.

Comparative Example D1

<Production and Evaluation of Carbon Fiber Reinforced Composite>

A carbon fiber reinforced composite was produced in the same manner as in Example D1, except that the unopened carbon fiber bundles were used. A laminate was produced from the carbon fiber reinforced composite of Comparative Example D1 in the same manner as in Example D1, and the bending strength was measured. The measurement results were as shown in Table D1 below.

TABLE D1

| | Diameter of Organic Particle (μm) | Bending Strength (MPa) |
|---|---|---|
| EX. 1 | 3 | 338.3 |
| EX. 2 | 10 | 372.7 |
| COMP. EX. 1 | Unopened | 240.5 |

In accordance with the preferred embodiment of the present invention, the present invention has been described above by way of example and not by limitation, and those skilled in the art shall recognize that without departing from the scope of the invention as defined by the appended claims, variations and/or modifications can be made thereto.

The invention claimed is:

1. A reinforcing fiber bundle comprising:
a plurality of reinforcing fibers, and
a cross-linking portion comprising a carbon allotrope between the reinforcing fibers,
wherein the cross-linking portion is formed by bonding a plurality of carbon allotrope particles,
wherein the carbon allotrope particles have an average particle diameter of 1 to 30 μm, and
wherein the content of the cross-linking portion is 1 to 5 parts by mass with respect to 100 parts by mass of the reinforcing fibers.

2. The reinforcing fiber bundle according to claim 1, wherein the carbon allotrope comprises an amorphous carbon.

3. The reinforcing fiber bundle according to claim 1, wherein the cross-linking portion further comprises coated particles obtained by coating particles selected from the group consisting of a thermosetting resin, a metal, silica, and a thermoplastic resin with the carbon allotrope.

4. The reinforcing fiber bundle according to claim 1, wherein the reinforcing fiber is oriented in one direction or in the form of a woven fabric.

5. The reinforcing fiber bundle according to claim 1, wherein the reinforcing fibers comprise carbon fibers.

6. A fiber-reinforced composite comprising the reinforcing fiber bundle according to claim 1 and a matrix resin.

7. The fiber-reinforced composite according to claim 6, wherein the matrix resin is a thermoplastic resin.

8. A method for producing a fiber-reinforced composite comprising a heat impregnation step of impregnating the reinforcing fiber bundle according to claim 1 with a matrix resin.

9. A method for producing a reinforcing fiber bundle, comprising:
an impregnation step of bringing a fiber pretreatment liquid comprising any one or more of particles selected from the group consisting of a thermosetting resin, a metal, silica, and a thermoplastic resin into contact with a plurality of reinforcing fibers to produce an impregnated fiber bundle;
a carbonization step of heating the impregnated fiber bundle to convert a thermosetting resin into a carbon allotrope; and
a bonding step of bonding a plurality of carbon allotrope particles to form a cross-linking portion,
wherein the carbon allotrope particles have an average particle diameter of 1 to 30 μm, and
wherein the content of the cross-linking portion is 1 to 5 parts by mass with respect to 100 parts by mass of the reinforcing fibers.

10. The method according to claim 9,
wherein the fiber pretreatment liquid further comprises a monomer which generates a thermosetting resin by polymerization reaction.

11. A reinforcing fiber-opening woven fabric formed of a warp bundle and a weft bundle, the bundle comprising carbon fibers and a cross-linking portion comprising a carbon allotrope different from the carbon fibers between the carbon fibers, wherein the cross-linking portion is formed by bonding a plurality of carbon allotrope particles, wherein the carbon allotrope particles have an average particle diameter of 1 to 30 μm, and wherein the content of the cross-linking portion is 1 to 5 parts by mass with respect to 100 parts by mass of the reinforcing fibers.

12. The reinforcing fiber-opening woven fabric according to claim 11,
wherein the cross-linking portion further comprises coated particles obtained by coating particles selected from the group consisting of a thermosetting resin, a metal, silica, and a thermoplastic resin with the carbon allotrope.

13. The reinforcing fiber-opening woven fabric according to claim 11,
wherein the carbon allotrope comprises a non-crystalline carbon.

14. The reinforcing fiber-opening woven fabric according to claim 11,
wherein the carbon allotrope is an amorphous carbon.

15. A fiber-reinforced composite comprising the reinforcing fiber-opening woven fabric according to claim 11 and a matrix resin.

16. A method for producing a fiber-reinforced composite comprising a heat impregnation step of impregnating the reinforcing fiber-opening woven fabric according to claim 11 with a matrix resin.

17. A method for producing a reinforcing fiber-opening woven fabric comprising:
a preparation step of a reinforcing fiber woven fabric formed of a warp bundle and a weft bundle comprising carbon fibers;
an impregnation step of bringing a fiber opening solution comprising a monomer which generates a thermosetting resin by polymerization reaction in contact with the reinforcing fiber woven fabric;
a carbonization step of heating the reinforcing fiber woven fabric containing the monomer from said impregnation step to convert the thermosetting resin into a carbon allotrope different from the carbon fibers; and
a bonding step of bonding a plurality of carbon allotrope particles to form a cross-linking portion between the carbon fibers,
wherein the carbon allotrope particles have an average particle diameter of 1 to 30 μm, and
wherein the content of the cross-linking portion is 1 to 5 parts by mass with respect to 100 parts by mass of the reinforcing fibers.

18. The method according to claim 17,
wherein the fiber opening solution further comprises any one or more particles selected from the group consisting of a thermosetting resin, a metal, silica, and a thermoplastic resin.

19. The method according to claim 17, further comprising a drying step after the carbonization step.

20. The method according to claim 17,
wherein the thickness of the reinforcing fiber-opening woven fabric produced through the each step is increased by 2% or more as compared with the thickness of the reinforcing fiber woven fabric.

* * * * *